INVENTORS
GUY R. LAFRAMBOISE
MERLE P. PRATER
BY Charles P. Boberg
ATTORNEY.

Nov. 7, 1961 G. R. LAFRAMBOISE ET AL 3,007,620

CARD PUNCHING DEVICE

Filed April 13, 1959 3 Sheets-Sheet 2

United States Patent Office 3,007,620

Patented Nov. 7, 1961

3,007,620

CARD PUNCHING DEVICE

Guy R. Laframboise and Merle P. Prater, Vestal, N.Y., assignors to International Business Machines Corporation, New York, N.Y., a corporation of New York Filed Apr. 13, 1959, Ser. No. 805,745
5 Claims. (Cl. 225—93)

This invention relates to card punching devices which are adapted to operate upon tabulating cards of the kind in which the index-point areas of each card are individually scored to provide selectively removable "chips" or punchouts.

In a device of this kind the instrument which is employed to remove the card material does not have a cutting or shearing action in the manner of an ordinary punch. Rather, it functions merely to apply to a selected chip sufficient force to break the frangible connections between that chip and the card, thereby detaching the chip from the card. The expressions "punch" and "punching," as employed herein, should be understood to have this particular meaning. Similarly, when reference is made to a "die" herein, this should not be construed as meaning a die of the kind in which a shearing action takes place. Expressions such as those just quoted are employed for convenience and for lack of a commonly accepted, more accurate terminology.

Card punching devices of the aforesaid type commonly include a punch board or die comprising parallel strips of thin resilient material that are adapted to provide a firm support for the main body of the card and to yield wherever necessary to permit the passage of a chip of card material as the same is pushed out of the card by the punching tool. When such a punch board or die is utilized, precautions should be taken to insure that all of the chips punched from the card are expelled from the resilient die strips and that none of these chips will remain caught in the grip of the resilient strips after the punching tool is withdrawn. If chips are permitted to accumulate between the resilient die strips, this can interfere with the punching operations, and occasionally it has been observed that a partially punched chip was left clinging to a card after the punch was withdrawn because the card-supporting surface of the punch board had become so clogged with chips as to prevent a clean punching operation. Incompletely punched cards can cause serious errors to occur in data processing operations utilizing such cards.

Analysis of this problem has led to the discovery that it is not the construction of the punch boards which is at fault in these situations; rather it is the design of the punching tools themselves, which in many cases have not cooperated effectively enough with the resilient die strips to accomplish the desired results. In this connection it must be emphasized that the presence of even one incompletely punched chip in a run of several thousand tabulating cards is in most cases too great a defect to be tolerated. Hence, the design of the punch becomes a critical and important factor in the successful use of prescored tabulating cards.

It is a broad object of this invention to improve the reliability of devices for punching data in prescored tabulating cards, to the end that all punched chips will be completely removed from the card and from the resilient die strips, with no possibility of a chip being left in a position where it can have a harmful effect.

It is a further object to provide an improved combination of a punch and cooperating resilient die strips so constituted and arranged as to insure that there will be a 100-percent-complete removal of all punched chips from the cards.

A more specific object of the invention is to provide, in a device of the character described, a punch having an improved tip configuration which will function, in every punching operation without exception, to punch out the selected chips and remove them completely from the card and from the underlying resilient die strips.

Other objects of the invention will be pointed out in the following description and claims and illustrated in the accompanying drawings, which disclose by way of examples, the principle of the invention and the best mode, which has been contemplated, of applying that principle.

FIGS. 8 to 12, inclusive, are enlarged sectional views respectively illustrating various steps that may be involved in punching a chip from the card.

Figure 1:
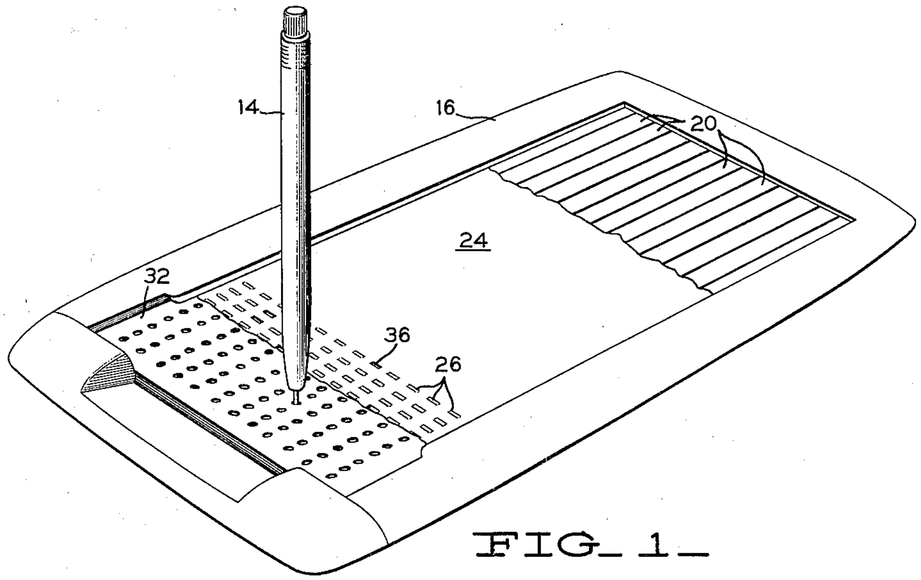
FIG. 1 is a perspective view of a manual card punching device in which the principles of the invention may be embodied.
Figure 2:
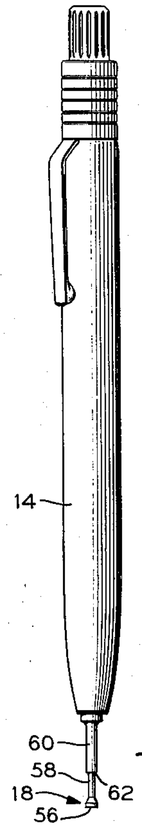
FIG. 2 is an elevational view of a manual punching implement in which the punch tip is constructed according to the principles of the invention.

As illustrated in FIG. 1, the manual card punching device comprises a punch 14 and a punch board or die 16. The punch 14, FIG. 2, has an operating tip 18 which preferably is arranged so that it can be retracted within the housing of the punch 14 when the implement is not in use. The punch board 16 has a plurality of resilient die strips 20, FIG. 3, mounted in a suitable base 22. In the illustrated construction each of the strips 20 is T-shaped in cross-section, with the shank of the T being received in a suitable channel afforded in the base 22. The particular manner in which these strips 20 are mounted on the base 22 is not an essential feature of this invention, however.

Figure 4:
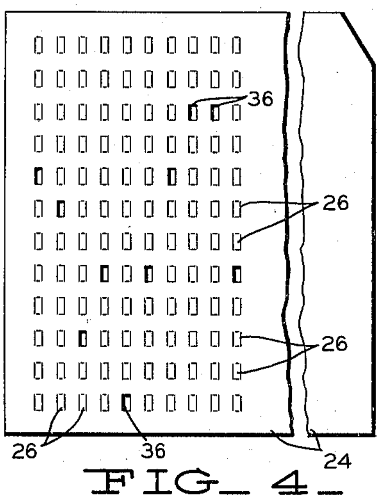
FIG. 4 is a fragmentary view of a tabulating card containing index-point areas which are individually scored so that they can be selectively removed by the punch, this being the type of card upon which the illustrated punching device is adapted to operate.
Figure 5:
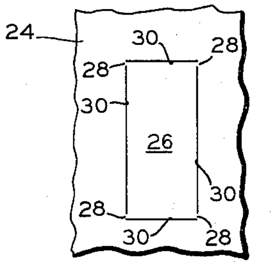
FIG. 5 is an enlarged fragmentary view of a scored index-point area on the card, showing the removable chip therein.

The punch board 16 is designed to receive and support a tabulating card 24, FIGS. 1 and 4, of the type in which at least some of the index-point areas on the card are individually scored to provide removable chips of card material 26 having frangible connections to the card. FIG. 5 illustrates in detail one of these removable chips 26 and its frangible connections 28, which are interspersed with the score lines 30 that define the edges of the individual index-point area occupied by the chip 26. The application of sufficient localized force to one of these chips 26 will cause the frangible connections 28 thereof to break, thus detaching the chip 26 from the card 24.

When forming data-representing holes in the card 24 by means of the manual punch 14, one places the card 24 in the punch board 16, FIG. 1, where it is supported by the resilient die strips 20. A guide template 32 made of transparent plastic, having a punched guide hole therein for each index point on the card, is usually employed in the board 16. After the card 24 is positioned on the punch board 16, the template 32 is placed above the card 24. The punch 14 then is selectively positioned with its tip 18 extending through a hole in the template 32 into engagement with a card chip at the selected index point. Sufficient pressure is applied by the punch against the card 24 for causing the aligned chip 26 to be pushed out of the card by the punch tip 18. This operation will be explained more specifically hereinafter.

Figure 3:
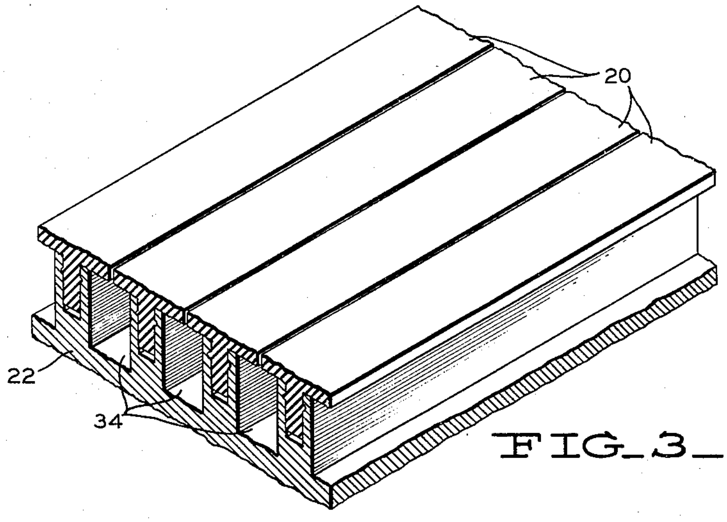
FIG. 3 is a fragmentary perspective view of the die or punch board with which the punch is adapted to cooperate.

The resilient die strips 20, FIG. 3, are so constructed and arranged that they firmly support the card 24 while it is being punched and yield wherever necessary to permit the passage of the punch tip 18 and the card chip 26 which has been punched out of the card. The strips 20 are arranged in close juxtaposed relationship, with the lines of separation between adjoining strips 20 being respectively disposed in alignment with the longitudinal rows of index points on the card 24 when the latter is positioned on the punch board 16.

Figure 8:
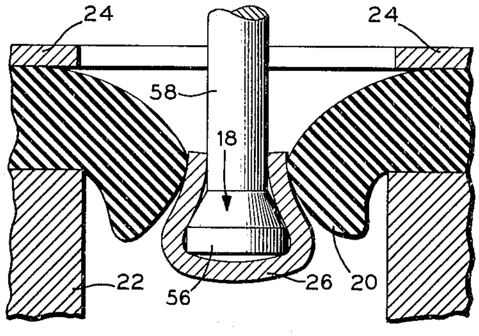
Figure 9:
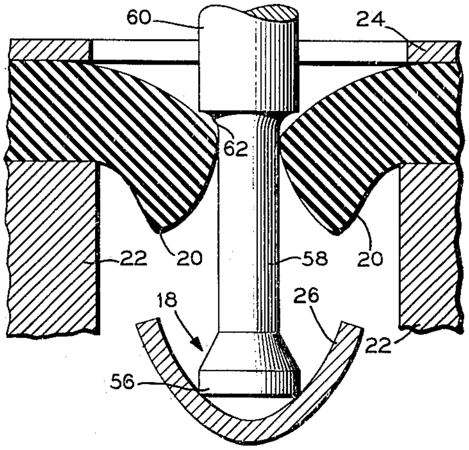

FIGS. 8 and 9 illustrate a typical manner in which a chip 26, after being detached from the card 24 by the punch tip 18, is forced down past a pair of adjoining resilient strips 20 as the punch tip 18 descends. (In this instance it has been assumed that the punch tip 18 is squarely centered with respect to the chip 26. Other instances in which this is not true will be considered hereinafter in connection with FIGS. 10, 11 and 12.) After being detached from the card 24 and pushed down past the die strips 20, the chips 26 collect in suitable cavities 34 in the base 22, from which cavities the chips later may be dislodged in any convenient manner. By thus removing selected chips 26 from each card 24, data-representing holes 36, FIG. 4, are formed in the tabulating cards.

Figure 6:
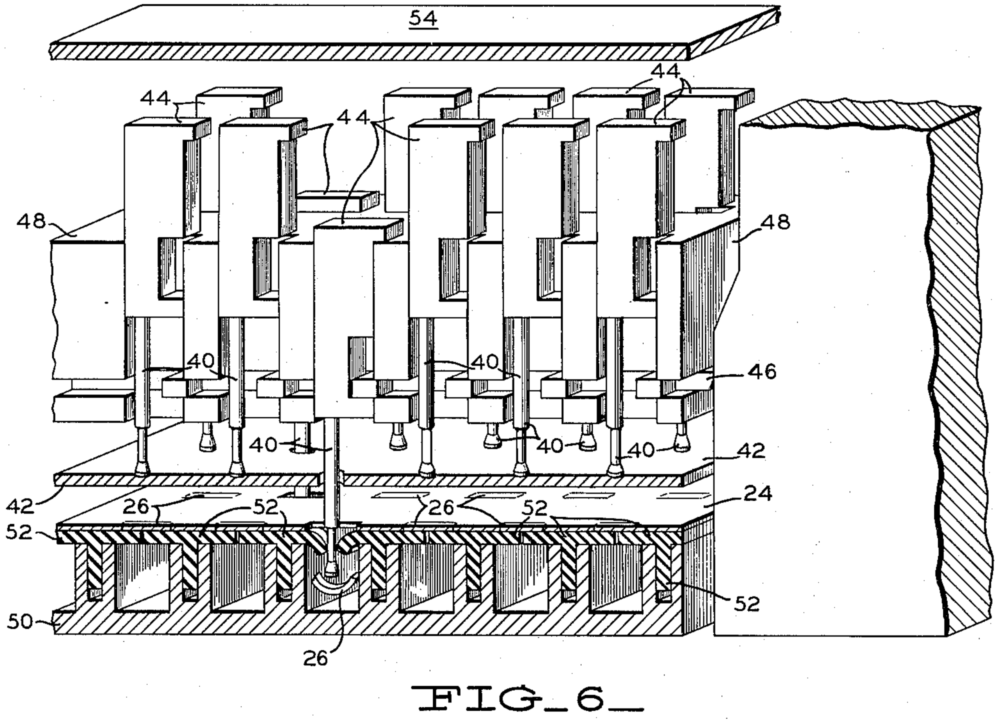
FIG. 6 is a partly sectional, perspective view showing another form of card punching device in which the principles of the invention may be embodied.

FIG. 6 illustrates a mechanized form of card punch in which punches or plungers 40, selectively settable to their active or inactive positions by a master plate or template 42, function to form holes in the card 24 by removing therefrom selected chips 26 of card material located at the prescored index-point areas on the card. This type of punch mechanism (except for its improved punch tip configuration and the use of a resilient die) is constructed on well-known principles. Briefly, each of the plungers 40 is joined to a notched control plate 44 which is adapted to cooperate with a lug on a horizontally movable locking bar 46 mounted in the punch head 48. The bar 46 slides transversely of the plungers 40 as the punch head 48 moves vertically. The template 42 is perforated only in those places where holes are to be formed in the card 24. As the punch head 48 descends, those plungers 40 which find holes in the template 42 will continue to move with the punch head 48 and will eventually be locked to the head 48 by corresponding lugs on the sliding bar 46. Those plungers 40 which are arrested by imperforate areas of the template 42 will cease their downward movement and will not be affected by the action of the locking bar 46, merely resting idly upon the upper surface of the template 42.

The active plungers 40, as they near the end of their downward strokes, will engage the aligned index-point areas of the card 24 and will push out the removable chips 26 positioned therein. The plungers 40 have tip configurations which are similar to that of the tip 18 in the manual punch 14, FIG. 2, and which will be described in detail presently. These plungers 40 operate in conjunction with a resilient board or die 50, FIG. 6, constructed in a manner similar to that of the punch board 16, FIG. 1. This die 50 comprises resilient strips 52 that support the card 24 while it is being punched and yield wherever necessary under the pressure of the active plungers 40 to permit passage of the detached card chips 26. When the punch head 48 returns to its uppermost position, it withdraws all of the active plungers 40 from the die 50 to a position above the template 42. The notched control plate 44 resets against a plate 54 at the top of the head 48 on the upstroke to insure realignment of all plungers 40 to their original positions.

Thus far we have considered the general operation of both manual and mechanized punches for selectively perforating tabulating cards of the type in which the respective index-point areas of a card are individually scored to provide selectively removable, frangible chips of card material therein. It is essential that these chips be detached cleanly from the card and that they do not accumulate in the grip of the resilient strips 20. The strips 20 are designed to support the chip 26 until all of its frangible connections 28 (FIG. 5) are broken, after which the strips 20 will yield under continued pressure of the punch tip 18 to permit passage of the detached chip 26 into the chip collecting space beneath the strips 20. If the strips 20 are not kept free of hanging card chips, there is a danger that a punched chip may be left clinging to a card after the card is withdrawn from the punch board. A similar thing could occur due entirely to the failure of the punch tip to maintain its control of the chip for a sufficient length of time to detach the chip from the card. Even a single, isolated instance of this among thousands of properly punched cards could cause serious trouble under some circumstances.

The improved punch tip 18 disclosed herein is of such a configuration that it will cooperate most effectively with the resilient strips 20 to prevent any punched card chip from lodging between the die strips 20 or hanging from the card after the punch has completed its operation. As shown best in FIG. 7, the punch tip 18 has three distinct portions: an outer end portion 56, a reduced shank portion 58 adjacent to the end portion 56, and a larger shank portion 60 which constitutes the balance of the punch tip 18. In the illustrated embodiment the end portion 56 has a cylindrical card-contacting part followed by a frustoconical part joining it to the shank portion 58. The cylindrical part of the end portion 56 has a diameter $D_1$ such as to prevent the card chip 26 from being punctured by the end portion 56 while the chip 26 is being detached from the card 24 and pushed through the die strips 20. On the other hand, the diameter of the end portion 56 at its widest part must be small enough so that it does not produce undue wear of the resilient die strips 20 during successive card punching operations.

It is assumed herein that the end portion 56 and the shank portions 58 and 60 are of circular cross-section. While this simplifies the manufacture of the punch tip, it is not a necessary condition for the practice of the invention. Configurations other than those illustrated herein may be utilized without departing from the spirit of the invention, which is concerned essentially with the provision of an undercut portion such as 58 and a well-defined shoulder such as 62 on the punch tip, for the purposes hereinafter described.

The reduced shank portion 58 has a cross-sectional area substantially smaller than the area of the cylindrical part of the outer end portion 56. As the chip 26 is pushed out of the card 24 by the end portion 56, it tends to flow back and wrap around the end portion 56, as shown in FIG. 8, and the trailing ends of the chip 26 are pressed by the resilient strips 20 against the reduced shank 58. The reduced diameter of the shank portion 58 eases the passage of the punch tip 18 between the die strips 20, and in conjunction with the action of the die strips 20, it tends to keep the chip 26 more firmly wrapped around the outer end portion 56. The axial length of the shank portion 58 is such that even when the chip 26 is engaged off-center by the punch tip 18, as shown in FIG. 10, some part of the shank portion 58 will be engaged by the extreme trailing end of the chip 26 as long as the latter is in contact with a die strip 20.

Figure 10:
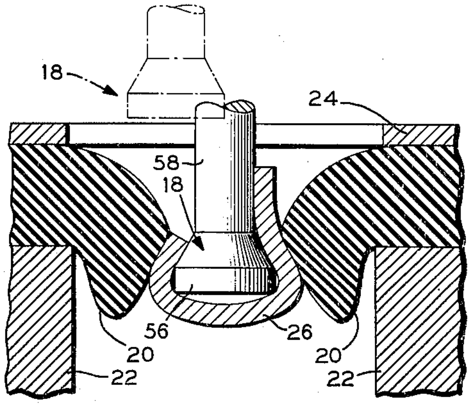

After the outer end portion 56 has traveled past the die strips 20, as shown in FIG. 8 or FIG. 10, the relaxation of the die strips 20 which then occurs will greatly facilitate the passage of the punch tip 18. If the punching force is being applied by hand, there will be a tendency for the punch to accelerate during this interval. Advantage is taken of this feature to expedite the clearing of the chip 26 from the die strips 20, as will be explained presently.

Figure 11:
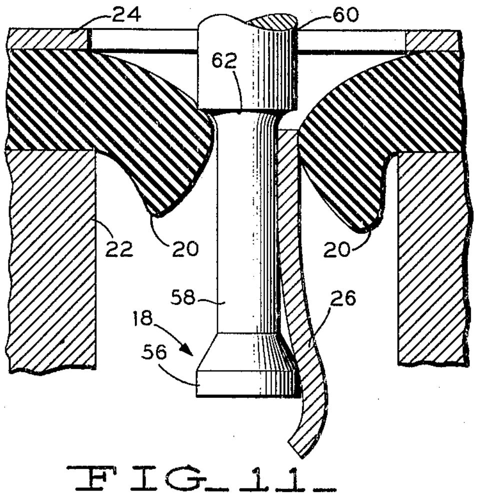
Figure 12:
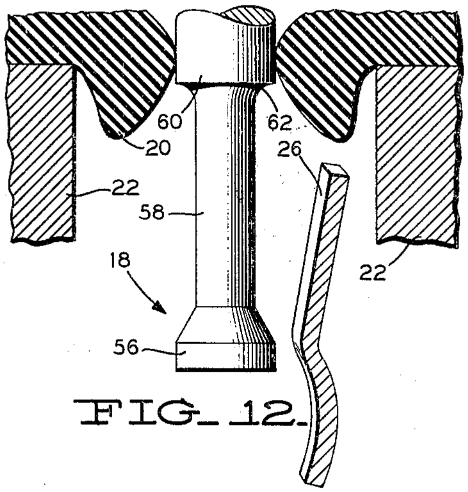

If the punch tip 18 is not accurately registered with the center of the chip 26 (as may occur quite often in practice, despite the guiding effect of the template 32), the chip 26 then will be folded in an unsymmetrical manner around the end 56 of the punch tip, as indicated in FIG. 10. In this view the initial position of the punch tip 18 is shown in phantom outline, the tip 18 engaging the card chip 26 off-center. As the punch tip 18 descends between the pair of die strips 20, it becomes better aligned with the gap between these two strips. However, the chip 26 will, in all probability, remain positioned eccentrically on the outer end 56, as shown in FIG. 10. Then, as the punch tip 18 continues to descend, the shorter end of the chip 26 becomes free while the longer end of the chip 26 still is held between the punch tip 18 and the adjacent die strip 20, as illustrated in FIG. 11. In the past this sort of situation has caused trouble on some occasions because there was a tendency for the chip 26 to remain caught in the grip of the associated die strips 20 after the punch was withdrawn. To prevent this and to insure that all punched chips, without exception, will be cleared from the die strips 20, it is proposed herein to provide the punch tip 18 with a relatively sharp shoulder 62 at the junction of its shank portions 58 and 60, FIG. 7. Preferably this is done by making the diameter of the shank portion 60 substantially the same as the diameter of the cylindrical part of the outer end portion 56. This provides a shoulder 62 of optimum width without increasing the diameter of the shank 60 to a point where it would in time cause undue wear of the die strips 20. As the shoulder 62 engages the die strip 20 which is holding the chips 26, FIG. 11, it comes into contact with the trailing edge of the chip 26. Continued downward movement of the shoulder 62 causes it to positively engage the chip 26 and push the chip 26 downwardly, dislodging it from the die strip 20. This insures that the chip 26 will not be left in the grip of the die strips 20 after the punch tip 18 has been withdrawn therefrom.

Where the punch is being operated mechanically, the length of the punching stroke can be adjusted so that the shoulder 62 of the punch tip will descend the necessary distance for expelling any chip 26 which may be caught between the shank portion 58 and a die strip 20. If the punching force is being applied by hand, the aforesaid relaxation effect, which occurs when the outer end portion 56 of the punch tip clears the die strips 20, will so ease the passage of the punch tip 18 that the tip is certain to accelerate and bring its shoulder 62 down between the strips 20 for thereby expelling the card chip. By repeated experiments it has been determined that if the shoulder 62 is properly located, the human hand is not able to arrest the movement of the punch tip 18 quickly enough (except by an effort not normally expended in practice) to prevent the shoulder 62 from passing between the strips 20 and expelling the chip, once the outer end 56 of the tip 18 has cleared these strips 20 during a chip removal operation.

Figure 7:
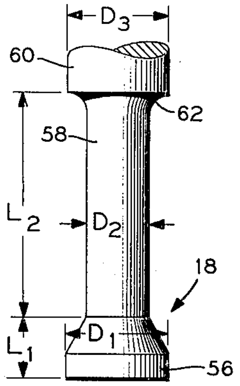
FIG. 7 is an enlarged elevational view of the improved punch tip.

In constructing a punch tip of the configuration shown in FIG. 7, it has been found that satisfactory results can be obtained by making the various dimensions thereof as follows:

| | Inch |
|---|---|
| Diameter $D_1$, outer end portion | .040 |
| Diameter $D_2$, reduced shank portion | .025 |
| Diameter $D_3$, shoulder portion | .040 |
| Length $L_1$, outer end portion | .023 |
| Including— | |
| Conical portion .013 inch | |
| Cylindrical portion .010 inch | |
| Length $L_2$, reduced shank portion | .083 |

The above listed dimensions are subject to variations within the criteria set forth generally in the foregoing description of operation. Thus, the outer end portion 56 and the larger shank portion 60 of the punch tip 18, FIG. 7, should be of sufficiently small diameter so that they will not cause undue wear of the die strips 20 or afford too great a resistance to movement of the punch tip through the die. On the other hand, the end portion 56 should be wide enough so that it will not have any tendency to puncture the chip 26 and thereby lose control of the chip, and it should be of short axial length so that the chip 26 will be able to wrap itself securely around the end portion 56 when it is passing through the die strips. The reduced shank portion 58 should offer materially less resistance to movement through the die strips than the end portion 56 does, and its length should be sufficient so that the extreme trailing end of a chip 26 will always lodge against some part of the shank portion 58 and not extend past the shoulder 62 onto the larger shank portion 60. This places the chip 26 in position to be positively engaged and expelled by the shoulder 62 if the chip still is held by a die strip 20 when the shoulder 62 strikes that die strip. A punch tip whose configuration meets these requirements will cooperate in an optimum fashion with the resilient die strips 20, according to the objectives of this invention, to eliminate the problems caused by chips left hanging in the die strips. What has just been stated with regard to the desired punch tip configuration shown in FIG. 7 will apply with equal force to both the manual form of punch shown in FIG. 2 and the mechanical type of punch shown in FIG. 6.

In order to give further significance to the above noted dimensions, it may be observed that the difference between the radius of the reduced shank portion 58 and the radius of the larger shank portion 60 (.0075 inch) is equal to the average thickness of a card chip. It is desirable that the annular shoulder 62 have at least this amount of radial width. Moreover, the total length of the reduced shank portion 58 and of the outer end portion 56, when added to the diameter of the outer end portion, gives a total effective length (.146 inch) that exceeds the length of a card chip (⅛ inch). Thus, in an extreme case where the card chip is positioned so far off-center that its leading end extends just over the end portion 56 without being wrapped back around this end portion, the trailing end of the chip still will lie against some part of the reduced shank portion 58 without extending past the shoulder 62.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A card punching device adapted to operate upon the type of tabulating card in which the respective index-point areas of the card are individually scored to provide at each such area a selectively removable chip of card material having frangible connections to the card, said device comprising a punch for applying force to a chip at a selected index point on the card to break said frangible connections and thereby detach said chip from the card, and die means having a plurality of resilient thin strips arranged in a close juxtaposed relationship for supporting the card while it is being punched and yielding under pressure of the punch to permit the passage of a chip which has been detached from the card, said punch having a tip which includes the following portions arranged longitudinally thereof in the order named: an outer end portion adapted to engage the selected card chip, a reduced shank portion of substantially smaller cross-sectional size but of substantially greater length than said end portion and of greater length than the length of a card chip, and a relatively sharp shoulder terminating said reduced shank portion, said shoulder extending from said reduced shank portion a distance at least equal to the thickness of a card chip for positively engaging and expelling a detached chip if the chip still is being held by one of said resilient strips when said shoulder engages that strip.

2. A card punching device as defined by claim 1 wherein said outer end portion and said shoulder are of substantially the same cross-sectional size.

3. A card punching device adapted to operate upon the type of tabulating card in which the respective index-point areas of the card are individually scored to provide at each such area a selectively removable chip of card material having frangible connections to the card, said device comprising a punch for applying force to a chip at a selected index point on the card to break said frangible connections and thereby detach said chip from the card, and die means having a plurality of resilient thin strips arranged in a close juxtaposed relationship for supporting the card while it is being punched and yielding under pressure of the punch to permit the passage of a chip which has been detached from the card, said punch having a tip which includes the following portions arranged longitudinally thereof in the order named: an outer end portion adapted to engage the selected card chip and having a cross-sectional area substantially smaller than the area of the chip but sufficiently large to prevent puncturing of the chip by said end portion as the chip is detached from the card, a first shank portion having a cross-sectional size substantially less than that of said end portion and having a length such that some part of said first shank portion will be engaged by the trailing end of any detached chip which is held between said punch tip and one of said resilient strips, and a second shank portion having a size and configuration such that it affords a relatively sharp shoulder at its junction with said first shank portion, said shoulder extending from said first shank portion a distance at least equal to the thickness of a card chip for positively engaging and expelling a detached chip if the chip still is being held by one of said resilient strips when said shoulder engages that strip.

4. A card punching device as defined by claim 3 wherein said outer end portion and said second shank portion are of substantially the same cross-sectional size.

5. A card punching device of the type having parallel strips of resilient material arranged to support in punching position a tabulating card whose respective index-point areas are individually scored to provide at each index point a selectively removable rectangular chip of card material having predetermined thickness and length, a punching instrument having a chip-removing tip which comprises the following portions arranged in the order named: an outer end portion of circular cross section for engaging the chip which is to be removed from the card, a first shank portion having a circular cross section smaller than that of said outer end portion, and a second shank portion having a circular cross section larger than that of said first shank portion and forming at its junction with said first shank portion a relatively sharp annular shoulder whose radial width is at least equal to the thickness of a card chip, the total axial length of said first shank portion and of said outer end portion plus the diameter of said outer end portion exceeding the length of the card chip.

No references cited.

Dedication 3,007,620.—*Guy R. Laframboise* and *Merle P. Prater*, Vestal, N.Y. CARD PUNCHING DEVICE. Patent dated Nov. 7, 1961. Dedication filed Aug. 4, 1972, by the assignee, *International Business Machines Corporation.*

Hereby dedicates to the Public the remaining term of said patent.

[*Official Gazette January 16, 1973.*]